United States Patent
Son et al.

(10) Patent No.: US 7,369,853 B2
(45) Date of Patent: May 6, 2008

(54) SYSTEM AND METHOD FOR IMPLEMENTING A HANDOFF IN A TRAFFIC STATE IN A BROADBAND WIRELESS ACCESS COMMUNICATION SYSTEM

(75) Inventors: Jung-Je Son, Seongnam-si (KR); So-Hyun Kim, Suwon-si (KR); Chang-Hoi Koo, Seongnam-si (KR)

(73) Assignee: Samsung Electronics Co., Ltd (KR)

(*) Notice: Subject to any disclaimer, the term of this patent is extended or adjusted under 35 U.S.C. 154(b) by 796 days.

(21) Appl. No.: 10/794,989

(22) Filed: Mar. 5, 2004

(65) Prior Publication Data
US 2004/0185852 A1    Sep. 23, 2004

(30) Foreign Application Priority Data
Mar. 8, 2003 (KR) .................. 10-2003-0014640

(51) Int. Cl.
*H04Q 7/20* (2006.01)
(52) U.S. Cl. .................. 455/436; 455/437; 455/438
(58) Field of Classification Search ............... 455/436, 455/437, 438, 439, 440, 441, 442
See application file for complete search history.

(56) References Cited

U.S. PATENT DOCUMENTS

| | | | |
|---|---|---|---|
| 5,317,623 A * | 5/1994 | Sakamoto et al. ........... | 455/436 |
| 6,393,008 B1 * | 5/2002 | Cheng et al. ............... | 370/338 |
| 7,042,858 B1 * | 5/2006 | Ma et al. .................... | 370/331 |
| 7,096,030 B2 * | 8/2006 | Huomo ..................... | 455/456.3 |

OTHER PUBLICATIONS

Kitroser et al: IEEE802.16e Mobility Enhancements.*

* cited by examiner

*Primary Examiner*—Melur Ramakrishnaiah
(74) *Attorney, Agent, or Firm*—The Farrell Law Firm, PC

(57) ABSTRACT

A broadband wireless access (BWA) communication system including a serving BS for servicing an SS in at least one of a plurality of sub-carrier frequency bands, and a plurality of neighbor BSs adjacent to the serving BS. The SS measures CINRs of frequency band signals from the neighbor BSs, requests a handoff for a target BS having the highest CINR to the serving BS, transitions to the frequency band of the target BS, and acquires synchronization to the target BS. The SS transmits ranging information to the target BS in a ranging information region assigned by the target BS, receives from the target BS connection ID information between the target BS and the SS, transmits a handoff registration request message to the target BS according to the connection ID information, and receives a response message for the handoff registration request message from the target BS.

28 Claims, 10 Drawing Sheets

SYSTEM AND METHOD FOR IMPLEMENTING A HANDOFF IN A TRAFFIC STATE IN A BROADBAND WIRELESS ACCESS COMMUNICATION SYSTEM

PRIORITY

This application claims priority under 35 U.S.C. § 119 to an application entitled "System and Method for Implementing Handoff in Traffic State in a Broadband Wireless Access Communication System" filed in the Korean Intellectual Property Office on Mar. 8, 2003 and assigned Serial No. 2003-14640, the contents of which are incorporated herein by reference.

BACKGROUND OF THE INVENTION

1. Field of the Invention

The present invention relates generally to a broadband wireless access (BWA) communication system, and in particular, to a system and method for implementing a handoff as determined by a subscriber station (SS) in a traffic state in a BWA communication system using OFDM (Orthogonal Frequency Division Multiplexing).

2. Description of the Related Art

Currently, a number of studies are being conducted on providing of services with diverse QoSs (Qualities of Service) at or above about 100 Mbps to users in a next generation mobile communication system, i.e., a $4^{th}$ (4G) generation communication system. The existing 3G communication systems support about 384 Kbps in an outdoor channel environment that is relatively poor and up to 2 Mbps in an indoor channel environment that is relatively good. Wireless LAN (Local Area Network) systems and wireless MAN (Metropolitan Area Network) systems generally support 20 to 50 Mbps. In this context, a new communication system is being developed by guaranteeing mobility and QoS to the wireless LAN and MAN systems supporting relatively high data rates, thereby supporting high-speed services intended in the 4G communication system.

Despite its feasibility for high-speed communication service due to a wide coverage area and a high data rate, the wireless LAN systems have no provisions for the mobility of an SS or a handoff caused by fast movement of the SS (i.e., cell selection). A communication system based on IEEE (Institute of Electrical and Electronics Engineers) 802.16a communicates through ranging between an SS and a base station (BS). This system will be described with reference to FIG. 1.

FIG. 1 schematically illustrates a conventional OFDM/OFDM-based BWA communication system, particularly an IEEE 802.16a/IEEE 802.16e communication system. However, before describing FIG. 1, it is important to address how the IEEE 802.16a/IEEE 802.16e communication system was developed. The wireless MAN system is a kind of BWA communication system. As compared to the wireless LAN system, it offers wider coverage and supports higher data rates. OFDM and OFDMA (Orthogonal Frequency Division Multiplexing Access) were introduced to the physical channel of the wireless MAN system to support a broadband transmission network. This system is the IEEE 802.16a communication system. The application of OFDM/OFDMA to the wireless MAN system enables the IEEE 802.16a communication system to transmit a physical channel signal over a plurality of sub-carriers, for high-speed data transmission. The IEEE 802.16e communication system, which is an extension of IEEE. 802.16a, introduces nomadic capabilities (mobility of SS). However, the IEEE 802.16e communication system is yet to be specified.

Referring to FIG. 1, the IEEE 802.16a/IEEE 802.16e communication system is configured in a single cell architecture. It comprises a BS 100 and a plurality of SSs 110, 120, and 130 covered by the BS 100. Signal transmission/reception between the BS and the SSs 110, 120, and 130 is performed in OFDM/OFDMA.

FIG. 2 schematically illustrates a downlink frame in the conventional OFDM/OFDM-based BWA communication system, particularly the downlink frame of the IEEE 802.16a/IEEE 802.16e communication system. Referring to FIG. 2, the downlink frame includes a Preamble 200, a Broadcast Control 210, and a plurality of TDM (Time Division Multiplex) fields 220 and 230. The Preamble 200 delivers a synchronization signal, namely a preamble sequence for synchronizing a BS and an SS. The Broadcast Control 210 contains a DL (Downlink)_MAP 211 and a UL (Uplink)_MAP 213. The DL_MAP 211 delivers a DL_MAP message, which includes the information elements (IEs) as shown below in Table 1.

TABLE 1

| Syntax | Size | Notes |
|---|---|---|
| DL-MAP_Message_Format( ) { | | |
|   Management Message Type = 2 | 8 bits | |
|   PHY Synchronization Field | Variable | See appropriate PHY specification. |
|   DCD Count | 8 bits | |
|   Base Station ID | 48 bits | |
|   Number of DL-MAP Elements n | 16 bits | |
|   Begin PHY Specific Section { | | See applicable PHY section. |
|     for(i=1; i<=n; i++) { | | For each DL-MAP element 1 to n. |
|       DL_MAP_Information_Element( ) | Variable | See corresponding PHY specification. |
|       if!(byte boundary) { | | |
|         Padding Nibble | 4 bits | Padding to reach byte boundary. |
|       } | | |
|     } | | |
|   } | | |
| } | | |

In Table 1, Management Message Type indicates the type of the transmitted message, PHY (PHYsical) Synchronization is set according to the modulation/demodulation of the physical channel, for synchronization acquisition, DCD (Downlink Channel Descript) Count is the number of changes in the configuration of a DCD message containing a downlink burst profile, Base Station ID (Identifier) identifies a BS, and Number of DL_MAP Elements n indicates the number of elements following Base Station ID. Although not shown in Table 1, the DL_MAP message further includes information about ranging codes assigned to respective ranging types as will described later in more detail.

The UL_MAP 213 delivers a UL_MAP message includes IEs as shown below in Table 2.

TABLE 2

| Syntax | Size |
| --- | --- |
| UL_MAP_Message_Format( ) { | |
|   Management Message Type=3 | 8 bits |
|   Uplink channel ID | 8 bits |
|   UCD Count | 8 bits |
|   Number of UL_MAP Elements n | 16 bits |
|   Allocation Start Time | 32 bits |
|   Begin PHY Specific Section { | |
|     for(i=1; i<n; i+n) | |
|       UL_MAP_Information_Element { | Variable |
|         Connection ID | |
|         UIUC | |
|         Offset | |
|       } | |
|     } | |
|   } | |
| } | |

In Table 2, Management Message Type indicates the type of the transmitted message, Uplink Channel ID identifies the uplink channel used, UCD (Uplink Channel Descript) Count is the number of changes in the configuration of a UCD message containing an uplink burst profile, and Number of UL_MAP Elements n indicates the number of elements following UCD Count. The Uplink Channel ID is assigned only in a MAC (Media Access Control) sub-layer.

An UIUC (Uplink Interval Usage Code) indicates the usage of an offset set in Offset. For example, if the UIUC is 2, this indicates that a starting offset for initial ranging is set in the Offset. If the UIUC is 3, this indicates that a starting offset for bandwidth request ranging (BW-request ranging) or maintenance ranging (periodic ranging) is set in the Offset. As described above, the Offset indicates the starting offset for initial ranging, BW-request ranging, or periodic ranging according to the information in the UIUC. Information about the feature of a physical channel that delivers the UIUC is provided in the UCD.

If an SS has failed in ranging, it determines a backoff value to increase success probability at a next attempt and retries the ranging after a time delay corresponding to the backoff value. Information needed to determine the backoff value is also provided by the UCD message. The structure of the UCD message will be detailed with reference to Table 3 below.

TABLE 3

| Syntax | Size | Notes |
| --- | --- | --- |
| UCD-Message_Format( ) { | | |
|   Management Message Type = 0 | 8 bits | |

TABLE 3-continued

| Syntax | Size | Notes |
| --- | --- | --- |
|   Uplink channel ID | 8 bits | |
|   Configuration Change Count | 8 bits | |
|   Mini-slot size | 8 bits | |
|   Ranging Backoff Start | 8 bits | |
|   Ranging Backoff End | 8 bits | |
|   Request Backoff Start | 8 bits | |
|   Request Backoff End | 8 bits | |
|   TLV Encoded Information for the overall channel | Variable | |
|   Begin PHY Specific Section { | | |
|     for(i=1; i<n; i+n) | | |
|       Uplink_Burst_Descriptor | Variable | |
|     } | | |
|   } | | |
| } | | |

In Table 3, a Management Message Type indicates the type of the transmitted message, an Uplink Channel ID identifies the uplink channel used, a Configuration Change Count is the number of configuration changes counted by a BS, a Mini-slot Size indicates the size of an uplink physical channel mini-slot, a Ranging Backoff Start indicates the starting point of an initial ranging backoff, that is, the size of an initial backoff window for initial ranging, a Ranging Backoff End indicates the end point of the initial ranging backoff, that is, the size of a final backoff window for the initial ranging, a Request Backoff Start indicates the starting point of a backoff for contention data and requests, that is, the size of an initial backoff window for contention data and requests, and a Request Backoff End indicates the end point of the backoff for contention data and requests, that is, the size of a final backoff window for contention data and requests. The backoff is defined as a time delay value by which the SS waits for a ranging retry, if it fails in any rangings, which will be described in more detail herein below The BS transmits the backoff to the SS. For example, if the Ranging Backoff Start and Ranging Backoff End indicate "10", the SS attempts the next ranging after a time delay equivalent to $2^{10}$ (1024) ranging tries.

The TDM fields 220 and 230 correspond to time slots assigned to SSs in TDMA (Time Division Multiple Access). The BS broadcasts necessary information to SSs within its coverage area in the DL_MAP 211 of the downlink frame. Upon a power-on, each of the SSs monitors all frequency bands set for it and detects the strongest pilot channel signal, that is, a pilot channel signal having a highest CINR (Carrier to Interference Noise Ratio). A BS that transmits the highest CINR-pilot channel signal is designated by the SS as its serving BS. Additionally, the SS attains control information about its uplink and the downlink and information about the positions of actual transmit/receive data by checking the DL_MAP 211 and the UL_MAP 231.

FIG. 3 schematically illustrates an uplink frame in the conventional OFDM/OFDMA-based BWA communication system, particularly the IEEE 802.16a/IEEE 802.16e communication system. However, before describing FIG. 3, ranging types, that is, initial ranging, periodic ranging, and BW-request ranging, as provided by the IEEE 802.16a/IEEE 802.16e communication system will be described.

A. Initial Ranging

Initial ranging is performed upon a request from the BS to synchronize with the SS. The purposes of the initial ranging are accurate acquisition of a time offset and adjustment of transmit power between the SS and the BS. Upon a power-on, the SS synchronizes with the BS by receiving a DL_MAP message and a UL_MAP/UCD message, and performs initial ranging to adjust the time offset and transmit power with the BS. Because the OFDM/OFDMA in the IEEE 802.16a/IEEE 802.16e communication system is used, the ranging procedure requires ranging sub-channels and ranging codes. The BS assigns available ranging codes according to the usage, that is, type of ranging.

The ranging codes are generated by segmenting a PN (Pseudorandom Noise) sequence of, for example, $(2^{15-1})$ bits in length in predetermined units. In general, two 53-bit ranging sub-channels form one ranging channel and the ranging codes are produced by segmenting the PN code by the 106-bit ranging channel. Up to 48 ranging codes (RC#1 to RC#48) as constructed in this manner can be assigned to SSs. For each SS, at least two ranging codes as a default are applied to the three types of rangings, i.e., initial ranging, periodic ranging, and BW-request ranging. Thus, different ranging codes are assigned to the three ranging types. For example, N ranging codes are assigned for initial ranging, M ranging codes for periodic ranging, and L ranging codes for BW-request ranging. The SSs are notified of ranging codes assigned to them by the DL_MAP message and perform ranging procedures using the ranging codes in compliance of their usages.

B. Periodic Ranging

After adjusting the time offset and transmit power with the BS by the initial ranging, the SS performs periodic ranging to adjust a channel state with the BS. For the periodic ranging, the SS uses ranging codes assigned for the periodic ranging.

C. BW-Request Ranging

After adjusting the time offset and transmit power with the BS by the initial ranging, the SS requests a bandwidth by ranging, for actual communication with the BS.

Referring to FIG. 3, an uplink frame comprises Initial Maintenance Opportunities 300 for initial ranging and periodic ranging, Request Contention Opportunities 310 for BW-request ranging, and SS Scheduled Data fields 320 including uplink data. The Initial Maintenance Opportunities 300 includes a plurality of access bursts for initial ranging and periodic ranging, and a collision period produced when a collision occurs between the access bursts. The Request Contention Opportunities 310 includes a plurality of bandwidth requests for bandwidth request ranging, and a collision period produced when a collision occurs between the bandwidth requests. The SS Scheduled Data fields 320 include SS1 Scheduled Data to SS N Scheduled Data. An SS transition gap exists between adjacent SS Scheduled Data fields.

FIG. 4 is a flowchart illustrating a ranging procedure between an SS and a BS in the conventional OFDM-based BWA communication system. Referring to FIG. 4, upon a power-on, an SS 400 monitors all predetermined frequency bands and detects a pilot channel signal with a highest CINR. Considering a BS 420 that transmits the detected pilot channel signal as a serving BS, the SS 400 acquires system synchronization with the BS 420 by receiving the preamble of a downlink frame from the BS 420.

As described above, with the system synchronization acquired, the BS 420 transmits DL_MAP and UL_MAP messages to the SS 400 in steps 411 and 413. As illustrated in Table 1, the DL_MAP message provides information needed for the SS 400 to synchronize with the BS 420, and information about the configuration of a physical channel that delivers messages to the SS 400 on the downlink after synchronizing. As illustrated in Table 2, the UL_MAP message provides the SS 400 with information about a scheduling period for the SS 400 and the configuration of an uplink channel.

The BS 420 periodically broadcasts the DL_MAP message to all SSs. When the SS 400 is capable of receiving the DL_MAP message continuously, it is said that the SS 400 is synchronized to the BS 420. That is, SSs, which have received the DL_MAP message, can receive all downlink messages.

As illustrated in Table 3, the BS 420 transmits to the SS 400 a UCD message containing information about a backoff value in case of access failure.

For ranging, the SS 400 transmits a Ranging. Request (RNG_REQ) message to the BS 420 in step 415. In step 417, the BS 420 then transmits to the SS 400 a Ranging Response (RNG_RSP) message containing information required to adjust frequency, time offset, and transmit power.

The RNG_REQ message is formatted as illustrated in Table 4 below.

TABLE 4

| Syntax | Size | Notes |
| --- | --- | --- |
| RNG-REQ_Message_Format( ) { | | |
|   Management Message Type = 4 | 8 bits | |
|   Downlink Channel ID | 8 bits | |
|   Pending Until Complete | 8 bits | |
|   TLV Encoded Information | Variable | TLV specific |
| } | | |

In Table 4, a Downlink Channel ID indicates the ID of the downlink channel that has delivered the UCD message to the SS 400. Pending Until Complete indicates the priority level of an RNG_RSP message for the RNG_REQ message. If the Pending Until Complete is 0, a previous RNG_RSP has higher priority. If the Pending Until Complete is not 0, an RNG_RSP for the current RNG_REQ has priority over an RNG_RSP for any other RNG_REQ.

The RNG_RSP message in response for the RNG_REQ message illustrated in Table 4 is formatted as illustrated in Table 5 below.

TABLE 5

| Syntax | Size | Notes |
| --- | --- | --- |
| RNG-RSP_Message_Format( ) { | | |
|   Management Message Type = 5 | 8 bits | |
|   Uplink Channel ID | 8 bits | |
|   TLV Encoded Information | Variable | TLV specific |
| } | | |

In Table 5, an Uplink Channel ID is the ID of the uplink channel that has delivered the RNG_REQ message.

Herein below, a ranging procedure in an OFDMA-based IEEE 802.16e communication system will be described below. In the OFDMA-based IEEE 802.16e communication system, instead of transmitting the RNG_REQ message, a dedicated region for ranging is set and a ranging code is transmitted in the dedicated region, to thereby perform the ranging more efficiently.

FIG. 5 is a flowchart illustrating a ranging procedure between an SS and a BS in the conventional OFDMA-based BWA communication system. Referring to FIG. 5, upon a power-on, a BS 520 transmits DL_MAP and UL_MAP messages to an SS 500 in steps 511 and 513, respectively. Steps 511 and 513 are performed in the same manner as steps 411 and 413 of FIG. 4. Thus, they are not detailed here.

Instead of transmitting the RNG_REQ message as illustrated in FIG. 4, the SS 500 transmits a ranging code to the BS 520 in step 515. The BS 520 transmits an RNG_RSP message for the ranging code to the SS 500 in step 517.

In relation to the ranging code, the RNG_RSP message further includes the following:

1. Ranging Code: a received ranging CDMA code;
2. Ranging Symbol: the OFDM symbol in which the ranging CDMA code was received;
3. Ranging Sub-channel: the ranging sub-channel in which the ranging CDMA code was received; and
4. Ranging Frame Number: the frame number in which the ranging CDMA code was received.

As described above, the IEEE 802.16a communication system works for fixed SSs in a single cell structure with no regard to the mobility of the SSs. Further, the IEEE 802.16e communication system adds SSs' mobility to the IEEE 802.16a communication system. Therefore, it must support the mobility in a multi-cell environment. To do so, the operations of the SS and the BS must be modified. However, no specific proposals have been made for the multi-cell and the SSs' mobility for the IEEE 802.16e communication system. Therefore, there is a pressing need for providing a handoff for an SS under a multi-cell environment in order to support the mobility of the SS in the IEEE 802.16e communication system.

SUMMARY OF THE INVENTION

An object of the present invention is to substantially solve at least the above problems and/or disadvantages and to provide at least the advantages below. Accordingly, an object of the present invention is to provide a handoff system and method for ensuring mobility in a BWA communication system.

Another object of the present invention is to provide a system and method for enabling an SS to determine a handoff in a traffic state in a BWA communication system.

The above objects are achieved by providing a system and method for implementing a handoff in a traffic state in a BWA communication system.

According to one aspect of the present invention, in a BWA communication system including a serving BS for servicing an SS in at least one of a plurality of sub-carrier frequency bands, and a plurality of neighbor BSs adjacent to the serving BS, to implement a handoff to one of the neighbor BSs as a target BS, the SS receives information about the neighbor BSs from the serving BS, measures the CINRs of frequency band signals from the neighbor BSs, selects a target BS having the highest of the CINRs, requests a handoff for the target BS to the serving BS, transitions to the frequency band of the target BS, and synchronizes to the target BS. After being assigned to a ranging information region for initial connection from the target BS, the SS transmits ranging information for the initial connection to the target BS in the assigned ranging information region, receives from the target BS connection ID information between the target BS and the SS, transmits a handoff registration request message to the target BS according to the connection ID information, and receives a response message for the handoff registration request message from the target BS.

According to another aspect of the present invention, in a BWA communication system including a serving BS for servicing an SS in at least one of a plurality of sub-carrier frequency bands, and a plurality of neighbor BSs adjacent to the serving BS, to implement a handoff upon request from the SS, the serving BS transmits information about the neighbor BSs to the SS, receives from the SS a handoff reserved request message including information about a neighbor BS that the SS selects as a target BS for a handoff, transmits to the target BS a handoff reserved indicator message indicating a handoff request from the SS, receives from the target BS a handoff information request message requesting information about the SS, transmits to the target BS a handoff information response message including the information about the SS, receives from the target BS a handoff indicator message indicating the handoff of the SS to the target BS, and transmits to the target BS a handoff confirmation message confirming the handoff of the SS.

According to a further aspect of the present invention, in a BWA communication system including a serving BS for servicing an SS in at least one of a plurality of sub-carrier frequency bands, and a plurality of neighbor BSs adjacent to the serving BS, to implement a handoff upon handoff indication from the serving BS in response to a handoff request from the SS, a target BS receives from the serving BS a handoff reserved indicator message indicating a handoff request from the SS, assigns a ranging information region for initial connection to the SS, receives ranging information from the SS in the assigned ranging information region, transmits to the serving BS a handoff information request message requesting information about the SS, receives from the serving BS a handoff information response message including the information about the SS, transmits to the SS a ranging response message including new connection identification information, receives from the SS a handoff registration request message, transmits to the SS a handoff registration response message acknowledging the handoff registration of the SS, and transmits to the serving BS a handoff indicator message indicating completion of the handoff of the SS to the target BS.

According to still another aspect of the present invention, in a BWA communication system including a BS for servicing an SS in at least one of a plurality of sub-carrier frequency bands, and a plurality of neighbor BSs adjacent to the serving BS, in a system for implementing a handoff upon request from the SS, the serving BS transmits information about the neighbor BSs to the SS, transmits to a target BS a handoff reserved indicator message indicating a handoff request from the SS, upon receipt of a handoff reserved request message from the SS, the handoff reserved request message including information about a neighbor BS that the SS decides as the target BS for a handoff, and transmits to the target BS information about the SS, upon receipt from the target BS a handoff information request message requesting the information about the SS. The SS selects the target BS by measuring the CINRs of frequency band signals from the neighbor BSs detected from the received neighbor BS information, transmits to the serving BS the handoff reserved request message indicating the handoff of the SS to the target BS, transitions to the frequency band of the target BS, acquires synchronization with the target BS, is assigned to a ranging information region for initial connection from the target BS, transmits ranging information for the initial connection to the target BS in the assigned ranging information region, receives connection ID information between the target BS and the SS from the target BS, transmits a handoff registration request message to the target BS according to the connection ID information, and receives a response message for the handoff registration request message from the target BS. The target BS receives from the serving BS the handoff reserved indicator message indicating the handoff request from the SS, assigns the ranging information region for initial connection to the SS, receives the ranging information from the SS in the assigned ranging information region, transmits to the serving BS the handoff information request message requesting information about the SS, receives from the serving BS a handoff information response message including the information about the SS, transmits to the SS a ranging response message including the new connection ID information, receives from the SS the handoff registration request message, transmits to the serving BS a handoff indicator message indicating completion of the handoff of the SS to the target BS, and receives from the serving BS a handoff confirmation message in response for the handoff indicator message.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described in detail herein below with reference to the accompanying drawings. In the following description, well-known functions or constructions are not described in detail since they would obscure the invention in unnecessary detail.

Figure 1:
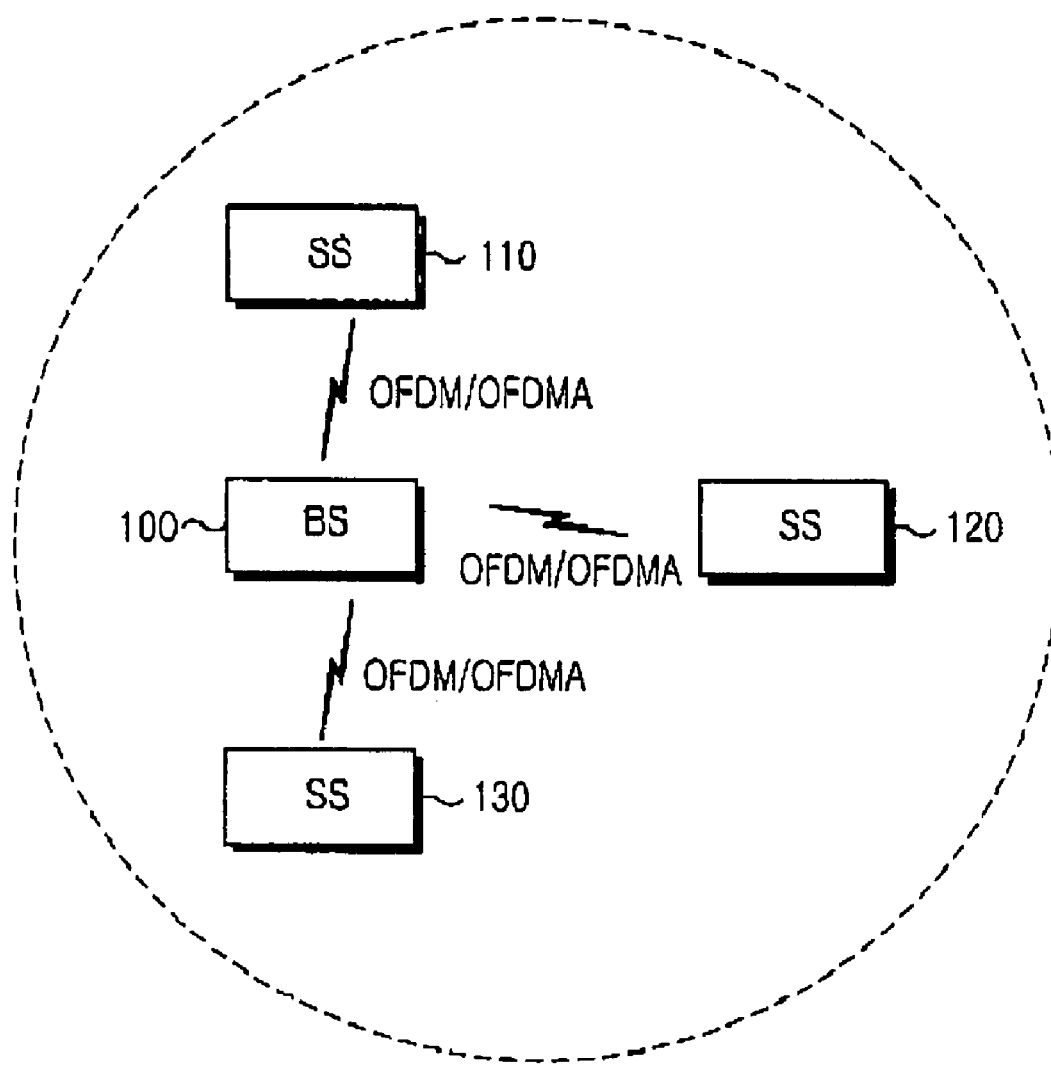
FIG. 1 schematically illustrates a conventional OFDM/OFDMA-based BWA communication system.
Figure 2:
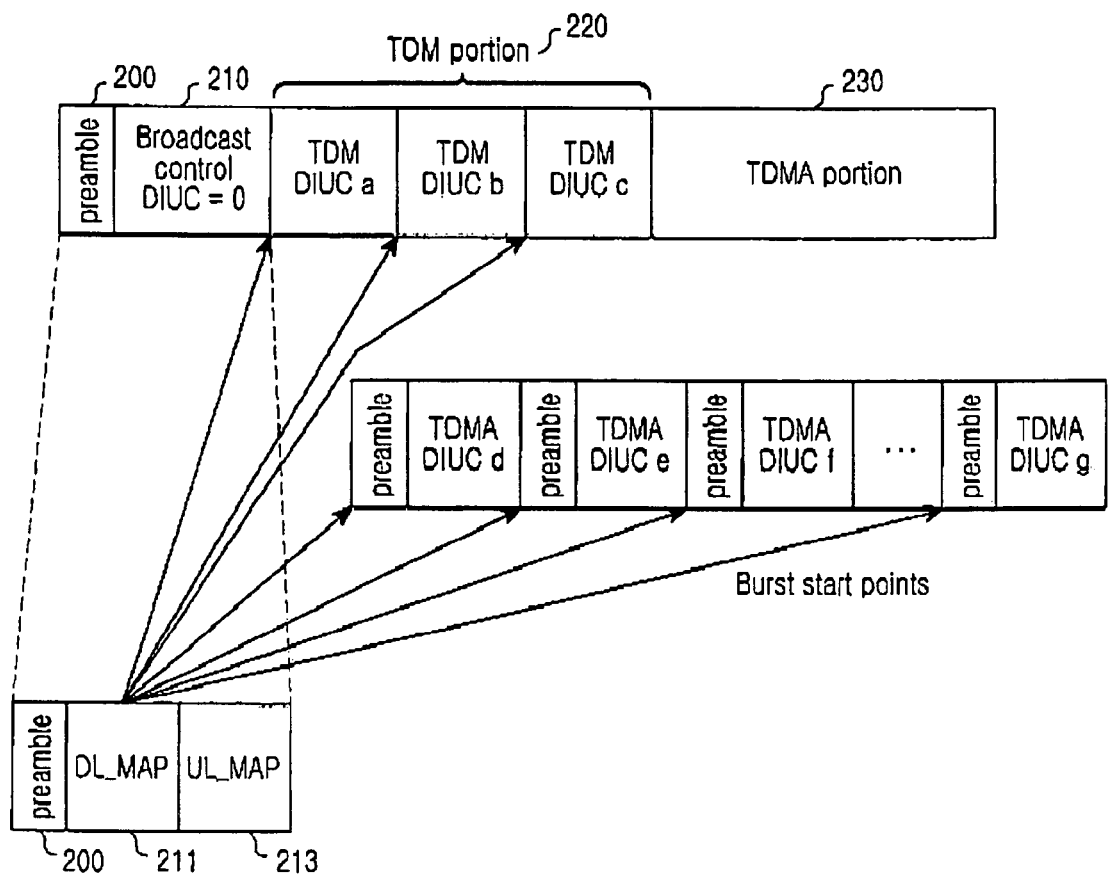
FIG. 2 schematically illustrates a downlink frame in the conventional OFDM/OFDMA-based BWA communication system.
Figure 3:
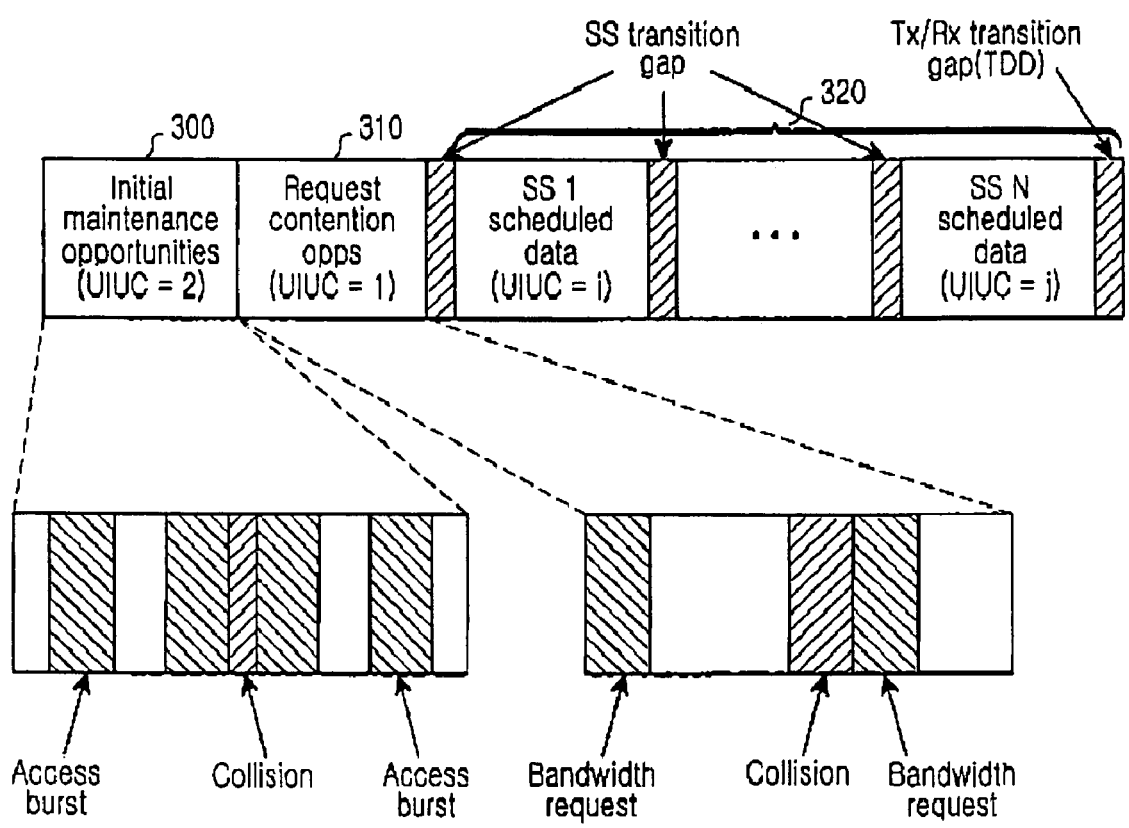
FIG. 3 schematically illustrates an uplink frame in the conventional OFDM/OFDMA-based BWA communication system.
Figure 4:
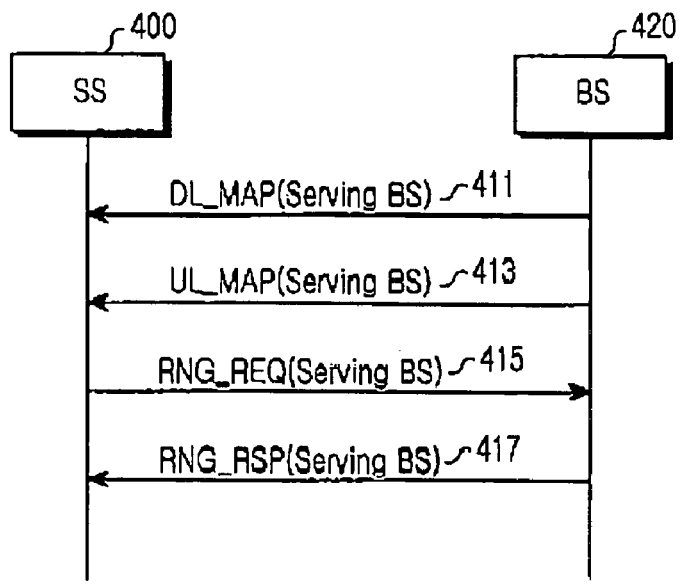
FIG. 4 is a diagram illustrating a signal flow for a ranging procedure in the conventional OFDM-based BWA communication system.
Figure 5:
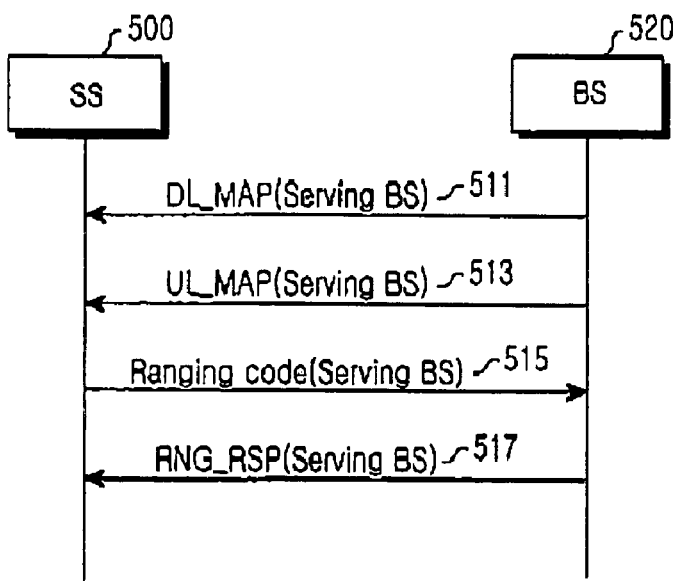
FIG. 5 is a diagram illustrating a signal flow for a ranging procedure in the conventional OFDMA-based BWA communication system.
Figure 6:
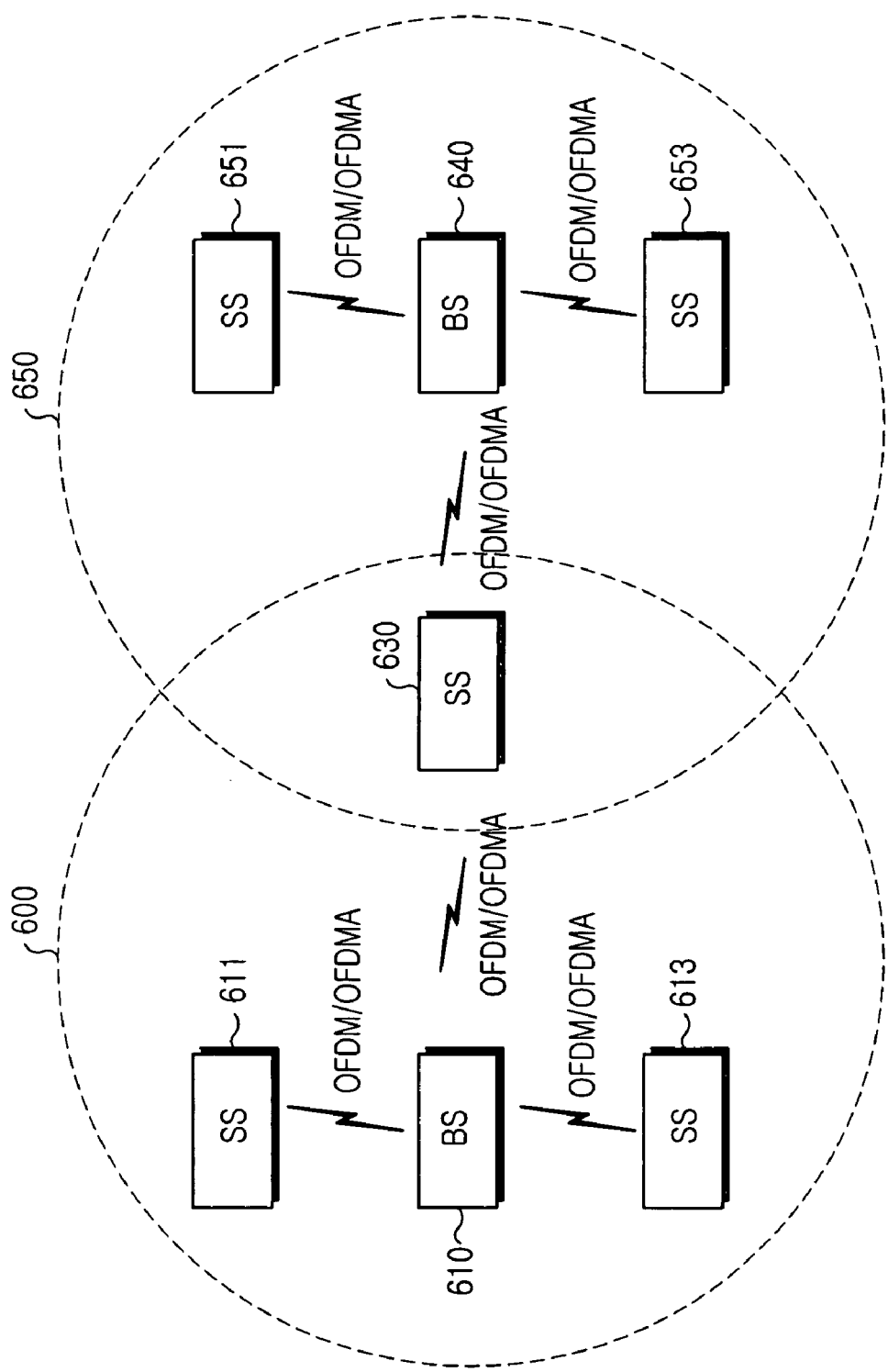
FIG. 6 schematically illustrates an OFDM/OFDMA-based BWA communication system to which the present invention is applied.

FIG. 6 schematically illustrates an OFDM/OFDMA-based BWA communication system to which the present invention is applied. Before describing FIG. 6, it is to be appreciated that the following description is made in the context of an IEEE 802.16e communication system as the OFDM/OFDMA-based BWA communication system. As stated earlier, the forthcoming IEEE 802.16e communication system considers the mobility of an SS but its specifics are yet to be proposed. Along with the mobility, a multi-cell structure and the handoff of an SS between cells (i.e. cell selection) can also be supported in the IEEE 802.16e communication system. Therefore, the present invention proposes an IEEE 802.16e communication system configuration as illustrated in FIG. 6. The IEEE 802.16e communication system is a BWA communication system based on OFDM/OFDMA. For notational simplicity, the IEEE 802.16e communication system is taken as an OFDM/OFDMA-based BWA communication system.

Referring to FIG. 6, the IEEE 802.16e communication system is configured in a multi-cell structure. Thus, it comprises a plurality of cells 600 and 650, a BS 610 covering the cell 600, a BS 640 covering the cell 650, and a plurality of SSs 611, 613, 630, 651, and 653. Signal transmission/reception is carried out in OFDM/OFDMA between the BSs 610 and 640 and the SSs 611, 613, 630, 651, and 653. Among the SSs 611, 613, 630, 651, and 653, the SS 630 is located at the boundary between the cells 600 and 650, that is, in a handoff area. Only if the handoff is supported for the SS 630, its mobility is also supported.

To support a handoff in the IEEE 802.16e communication system, novel MAC Management messages must be defined, or handoff information must be provided to the SS by existing IEEE 802.16e MAC Management messages, for example, a DL_MAP message. In the present invention, the handoff information is transmitted to the SS using the DL_MAP message. As stated earlier, the existing DL_MAP message is configured based on the concept of a single cell with no regard to the mobility of an SS. Therefore, the message must be modified to further include a field containing the handoff information according to the present invention. This modified DL_MAP message includes the IEs as shown below in Table 6.

TABLE 6

| Syntax | Size | Notes |
| --- | --- | --- |
| DL_MAP_Message_Format ( ) { | | |
|   Management Message Type=2 | 8 bits | |
|   PHY Synchronization Field | Variable | See appropriate PHY specification |
|   DCD Count | 8 bits | |
|   Base Station ID | 48 bits | |
|   Number of DL_MAP Elements n | 16 bits | |

TABLE 6-continued

| Syntax | Size | Notes |
| --- | --- | --- |
| Number of Neighbor BS n | 8 bits | Number of added neighbor BSs |
| For (k=1; k<=n; k++) { | | |
|   Neighbor List BS ID | 48 bits | IDs of neighbor BSs |
|   Neighbor Frequency | 8 bits | Frequencies of Neighbor BSs |
|   Neighbor Frame Offset | 8 bits | Frame offsets of neighbor BSs |
|   Idle HO Support | 1 bit | Indicates whether neighbor BSs support idle HO |
| } | | |
| Begin PHY Specific Section { | | See applicable PHY section |
| for (i=1; i<=n' i++) { | | For each DL_MAP_element 1 to n |
|   DL_MAP_Information_Element ( ) | Variable | See corresponding PHY specification |
|   if! (byte boundary) { | 4 bits | Padding to reach byte boundary |
|     Padding Nibble | | |
|   } | | |
| } | | |
| } | | |
| } | | |

Referring to Table 6, a Management Message Type indicates the type of the transmitted message, a PHY Synchronization is set according to the modulation/demodulation of the physical channel, for synchronization acquisition, a DCD Count is the number of changes in the configuration of a DCD message containing a downlink burst profile, a Base Station ID identifies a BS, and a Number of DL_MAP Elements n indicates the number of elements following Base Station ID. The DL_MAP message has particularly handoff information as mandatory. The handoff information is set in Number of Neighbor BS n, which indicates the number n of neighbor BSs that the SS continuously monitors for handoff.

The Number of Neighbor BS n includes Neighbor List BS ID indicating the IDs of the neighbor BSs, Neighbor Frequency indicating the center frequencies of the neighbor BSs, and Neighbor Frame Offset indicating the frame offsets of the neighbor BSs. The Neighbor Frame Offset provides information about frame offsets between the neighbor BSs as defined in the IEEE 802.16e communication system. Although not shown in Table 6, the DL_MAP message further includes information about ranging codes assigned for ranging types.

As the IEEE 802.16a communication system supports the mobility of an SS, the SS determines a handoff and implements it in accordance with the present invention. MAC Management messages needed for the handoff and a related message flow between BSs and the SS will be described herein below.

Figure 7:
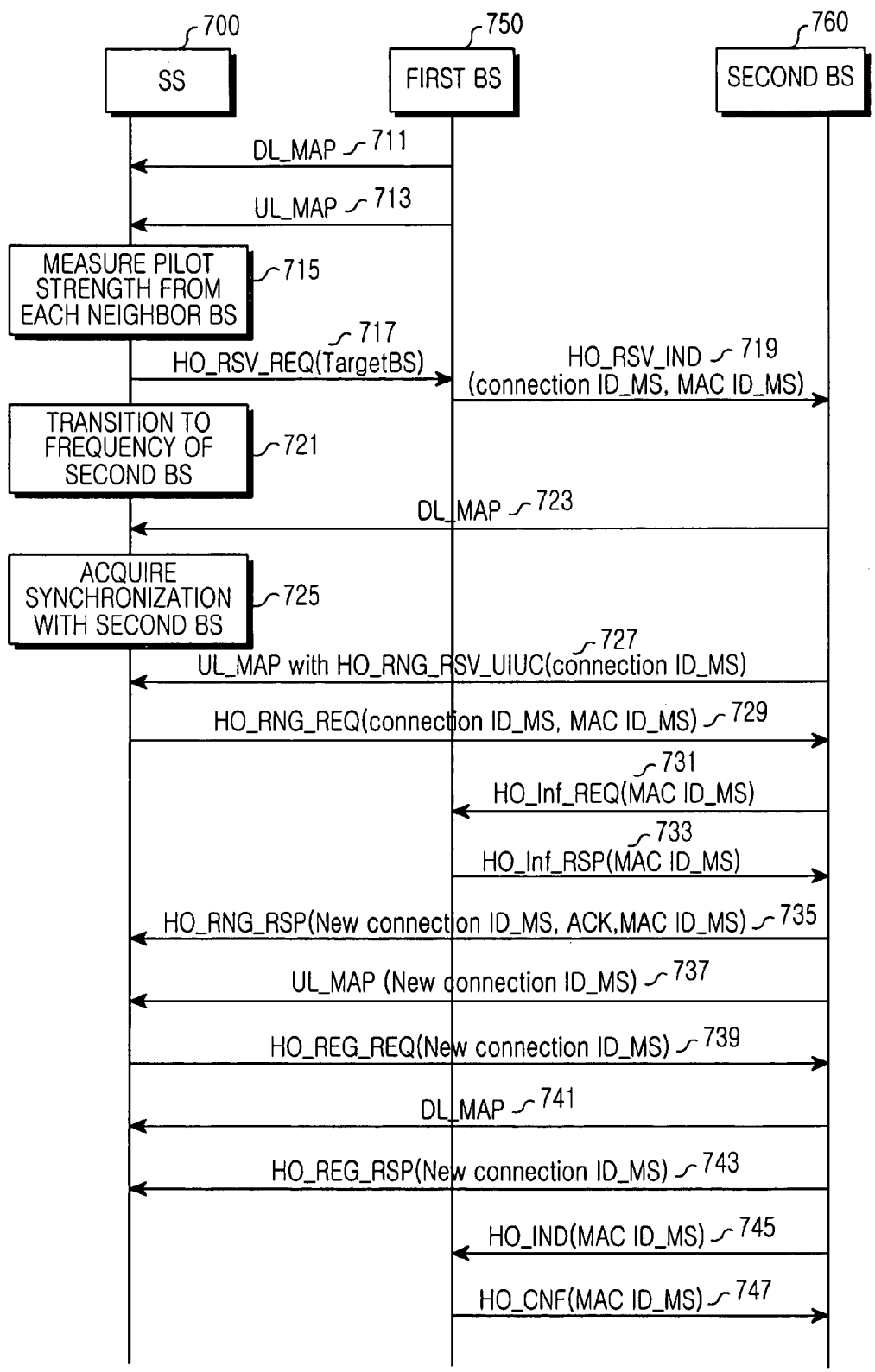
FIG. 7 is a diagram illustrating a signal flow for a handoff procedure in the OFDM-based BWA communication system according to an embodiment of the present invention.

FIG. 7 is a diagram illustrating a signal flow for a handoff in an OFDM-based BWA communication system according to an embodiment of the present invention. Referring to FIG. 7, data communication is in progress between an SS 700 and a first BS 750. The first BS 750 is a serving BS for the SS 700. According to the IEEE 802.16a standards, a service connection is established between an SS and a BS, and a connection ID identifying the service connection is assigned by message transmission/reception of DSA_REQ and DSA_RSP in a service negotiation step. Then data communication is carried out. The SS 700 in communication with the first BS 750 (i.e. in a traffic state) receives DL_MAP and UL_MAP messages from the first BS 750 in steps 711 and 713, as described above. These messages are formatted as illustrated in Table 6 and Table 2, respectively, and thus they are not detailed again herein.

As the SS 700 roams according to present invention, it moves out of the first BS 750 and enters one of neighbor BSs. The SS 700 receives knowledge of the neighbor BSs from the DL_MAP message and measures the CINRs of pilot channel signals from the neighbor BSs for a predetermined time in step 715. The information about the neighbor BSs can be delivered by a downlink message from the first BS 750 to the SS 700, other than the DL_MAP message.

If the CINR of a pilot channel signal from the first BS 750 is less than a predetermined threshold representative of an acceptable CFNR level for communication, or if a neighbor BS transmits a pilot channel signal with a higher CFNR than the first BS 750, the SS 700 attempts a handoff. Conditions under which a handoff occurs are implementation-dependent.

According to the present invention, the SS 700 determines a target BS to which the data communication is handed off based on the CINR measurements. Preferably, the SS 700 selects a neighbor BS having a highest of the measured CINRs. Yet, other criterion may apply to the selection.

If a handoff occurs as the above-described condition is satisfied, the SS 700 transmits a HandOff_ReSerVed_REQuest (HO_RSV_REQ) message to the first BS 750 in step 717. The HO_RSV_REQ message contains information about the target BS. In FIG. 7, the target BS is assumed to be a second BS 760. Also, the SS 700 requests assignment of a predetermine region of a UL_MAP by the HO_RSV_REQ message, for reliable connection to the second BS 760.

In an environment where the SS 700 cannot receive knowledge of the neighbor BSs, if it has a list of all BSs in an available frequency area, it measures the CINRs of pilot signals from the BSs in a predetermined order. The SS 700 selects a BS having a highest of CINRS greater than a threshold or an appropriate BS based on any other criterion, and requests a handoff to the selected BS.

Upon receipt of the HO_RSV REQ message, the first BS 750 transmits to the second BS 760 a HandOff_ReSerVed_INDicator (HO_RSV_IND) message containing the connection ID of the SS 700 in step 719.

Upon receipt of the HO_RSV_IND message, the second BS 760 assigns a contention-free region to the SS 700 using the connection ID by a UL_MAP message to enable the SS 700 set in the HO_RSV_REQ message to request the handoff to the second BS 760. The region assignment is carried out in each frame for a predetermined time period until the SS 700 requests the handoff successfully.

In the present invention, the SS 700 determines whether to implement the handoff. Irrespective of whether the SS 700 receives response for the HO_RSV_IND and HO_RSV REQ messages from the first and second BSs 750 and 760, the SS 700 transitions to the frequency of the second BS 760 after transmitting the HO_RSV_REQ message. That is, the SS 700 transitions from a frequency assigned to the first BS 750 to a frequency assigned to the second BS 760 to communicate with the second BS 760 in step 721.

The second BS 760 transmits a DL_MAP message to the SS 700 in step 723 and the SS 700 synchronizes to the second BS 760 by the DL_MAP message in step 725.

The second BS 760 transmits to the SS 700 a UL_MAP message with HandOff_RaNGing_ReSerVed Uplink Interval Usage Code (HO_RNG_RSV_UIUC) containing the connection ID of the SS 700 in step 727. The connection ID is a kind of the ID of the SS 700, e.g., a MAC ID. The UIUC, which is newly defined in the present invention, represents a contention-free region assigned by the UL_MAP message, for supporting fast handoff.

After the synchronizing, the SS 700 monitors the UL_MAP message received from the second BS 760.

If a handoff request region has been assigned to the SS 700 in the UL_MAP message, the SS 700 transmits an HO_RNG_REQ message to the second BS 760 in the assigned region in step 729. In the absence of the handoff request region assigned to the SS 700, the SS 700 transmits the HO_RNG_REQ message in an initial maintenance region as defined for ranging for the registration of a new SS in the IEEE 802.16a standards, or in a handoff maintenance region for a plurality of predetermined SSs, if this region exists.

Upon receipt of the HO_RNG_REQ message, the second BS 760 transmits to the first BS 750 a HandOff_Information_REQuest (HO_Inf REQ) containing the MAC ID of the SS 700, requesting handoff information containing service contents provided from the first BS 750 to the SS 700 and information about the registration of the SS 700 in step 731.

Upon receipt of the HO_Inf_REQ message from the second BS 760, the first BS 750 transmits to the second BS 760 a HandOff_Information_ReSPonse (HO_Inf_RSP) message in step 733. The second BS 760 receives knowledge of the service contents provided to the SS 700 by the first BS 750 and the information about the registration of the SS 700 by the HO_Inf_RSP message, determines whether to accept the handoff request, and transmits to the SS 700 a HandOff_RaNGing_ReSPonse (HO_RNG_RSP) message in step 735. The HO_RNG_RSP message contains a new connection ID assigned to the SS 700 (New Connection ID_MS), acknowledgement (ACK), and the MAC ID of the SS 700 (MAC ID_MS).

In initial ranging between the SS 700 and the second BS 760, the second BS 760 transmits UL_MAP and DL_MAP messages in step 737 and 741.

If the SS 700 is supposed to initially register to the second BS 760, it transmits a HandOff_REGistration_REQuest (HO_REG_REQ) message to the second BS 760 in step 739. When the SS 700 receives a HandOff_REGistration_ReSPonse (HO_REG RSP) message from the second BS 760 in step 743, the registration of the SS 700 to the second BS 760 is completed.

If the handoff to the second BS 760 is successful as described above, the second BS 760 notifies the first BS 750 of the handoff of the SS 700 to the second BS 760 by transmitting a HandOFF_INDicator (HO_IND) message in step 745. The first BS 750 transmits a HandOff_CoNFirmation (HO_CNF) message in response for the HO_IND message to the second BS 760 in order to notify that it confirms the completion of the handoff in step 747. Thus, the handoff is completed.

Figure 8:
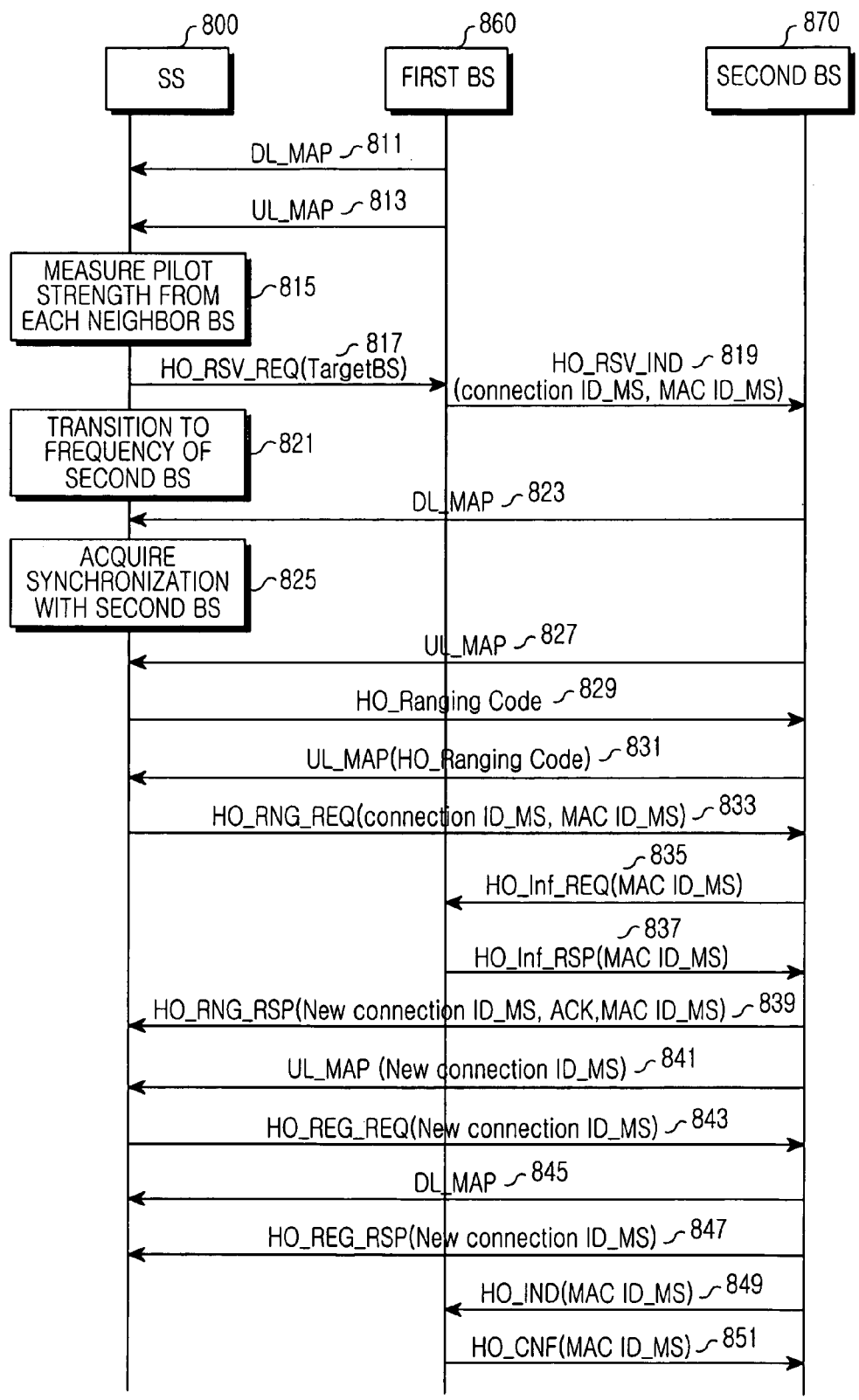
FIG. 8 is a diagram illustrating a signal flow for a handoff procedure in the OFDMA-based BWA communication system according to another embodiment of the present invention.

FIG. 8 is a diagram illustrating a signal flow for a handoff in an OFDMA-based BWA communication system according to another embodiment of the present invention. The handoff procedure illustrated in FIG. 8 is performed substantially in the same manner as that illustrated in FIG. 7, except that a ranging request message or a ranging code is transmitted depending on whether the IEEE 802.16e communication system is based on OFDM or OFDMA. Because steps 811 to 825 in FIG. 8 are the same as steps 711 to 725 in FIG. 7, their description is not provided again here.

Referring to FIG. 8, if a ranging code has already been assigned to an SS 800 to allow the SS 800 to request a handoff, the SS 800 requests the handoff to a second BS 870 using the handoff ranging code (HO_Ranging Code) in a region defined for transmission of the handoff ranging code in step 829. Upon receipt of the HO_Ranging Code, the second BS 870 assigns a region in which the SS 800 will transmit an HO_RNG_REQ message to the SS by a UL_MAP message in the next transmission frame in step 831. The SS 800 then transmits the HO_RNG_REQ message to the second BS 870 in the assigned region in step 843. The subsequent handoff completion procedure is performed in the same manner as illustrated in FIG. 7 and thus it is not described again here.

MAC Management messages newly defined or modified to implement the above-described handoff procedures are listed in Table 7 and Table 8 below.

TABLE 7

| MAC Management message | Parameter | Multi | Content |
|---|---|---|---|
| HO_RSV_REQ | Connection ID_MS | — | Connection ID of HO_RSV_REQ transmitting SS |
| HO_RNG_REQ | Target BS ID | — | ID of target BS |
|  | Connection ID_MS | — | Basic connection ID of SS |
|  | MAC ID | — | conventional 802.16 MAC ID |
|  | Serving BS ID | — | ID of serving BS |
|  | Transaction ID | — | Transaction ID of service to be handed off |
| HO_RNG_RSP | RNG_RSP parameters | (MAC ID, Primary Connection ID_MS, Secondary Connection ID_MS, Frequency Offset, Power Offset, Timing Offset) | Include all parameters in conventional RNG_RSP message |
|  | Registration Response | OK/NOK | Notify whether existing registration information is valid |
|  | Transaction ID | 16bit | Transaction ID of current service to be handed off |

TABLE 7-continued

| MAC Management message | Parameter | Multi | Content |
|---|---|---|---|
| | Service Flow Parameter | | Parameters for current service to be handed off |
| | HO_Ranging code, HO_Ranging Symbol, HO_Ranging Subchannel, HO_Ranging frame number | | |

TABLE 8

| BS to BS Interface Management message | Parameter | Multi | Content |
|---|---|---|---|
| HO_RSV_IND | Connection ID_MS | | connection ID of HO_RSV_REQ transmitting SS |
| | Serving BS Number | | ID of HO_RSV_IND transmitting BS |
| HO_Inf_REQ | Connection ID_MS | | connection ID of HO_RSV_REQ transmitting SS |
| | MAC ID_MS | | conventional 802.16 MAC ID |
| HO_Inf_RSP | Connection ID_MSs | | Connection IDs of HO_RSV_REQ transmitting SSs |
| | Transaction ID | | Transaction ID of current handoff service |
| | Service Flow Parameter | | Parameters for current handoff service |
| HO_IND | MAC ID_MS | | conventional 802.16 MAC ID |
| | Connection ID_MS | | connection ID of HO_RSV_REQ transmitting SS |
| HO_CNF | MAC ID_MS | | conventional 802.16 MAC ID |

The aforementioned HO_REQ_RSV_UIUC is also newly defined as follows:

1. Set an uplink interval at which an SS transmits HO_RNG_REQ to a BS;

2. Assign the region using the connection ID of the SS; and

3. Assign the region using HO_Ranging Code if the SS transmits HO_Ranging Code.

Figure 9:
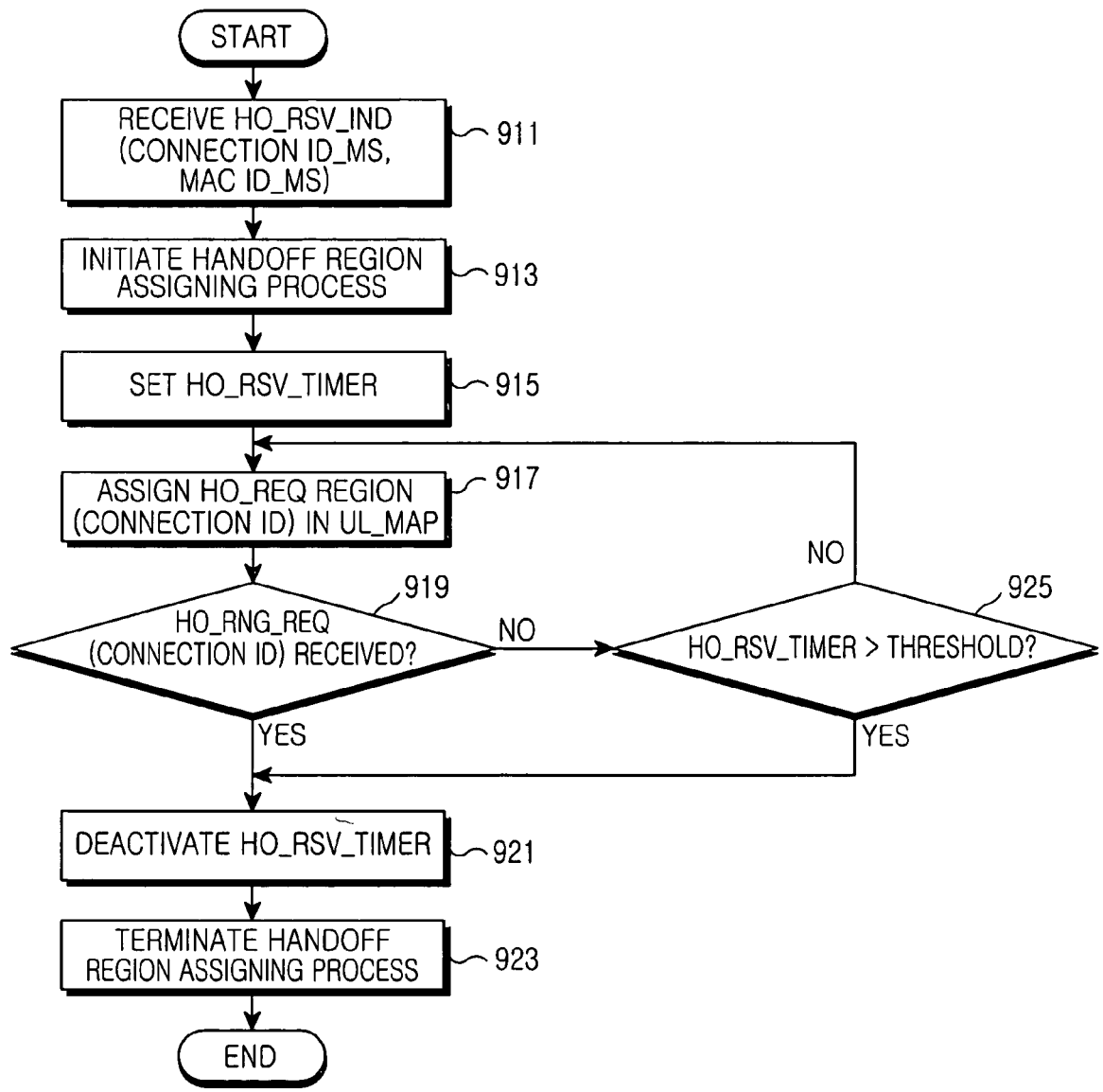
FIG. 9 is a flowchart illustrating an operation for assigning a ranging region in a second BS (target BS) in the OFDM-based BWA communication system according to the first embodiment of the present invention.

FIG. 9 is a flowchart illustrating a ranging region assigning operation in a second BS based on OFDM according to the first embodiment of the present invention. However, before describing FIG. 9, it is to be understood that the second BSs 760 and 870 illustrated in FIGS. 7 and 8 operate substantially in the same manner. For conciseness, the second BS 760 is used.

Referring to FIG. 9, the second BS 760 receives an HO_RSV_IND message from the first BS 750 in step 911. From the MAC ID of the SS 700 included in the HO_RSV_IND message, the second BS 760 recognizes that the SS 700 has requested a handoff to the second BS 760.

The second BS 760 initiates a handoff region assigning process in step 913 and sets a HO_RSV_timer in step 915. Then, the second BS 760 assigns an HO_REQ region to the SS by a UL_MAP message in step 917. That is, the UL_MAP message delivers the HO_REQ region assignment information to the SS 700 and the SS 700 transmit an HO_RNG_REQ message to the second BS 760 in the HO_REQ region assigned by the UL_MAP message.

Upon receipt of the HO_RNG_REQ message in step 919, the second BS 760 deactivates the HO_RSV_timer in step 921. However, if the second BS 760 fails to receive the HO_RNG_REQ message in step 919, the second BS 760 determines whether the HO_RSV_timer value exceeds a threshold in step 925. If the HO_RSV_timer value exceeds a threshold, the second BS 760 deactivates the HO_RSV_timer in step 921. The handoff region assigning procedure is terminated in step 923.

Figure 10:
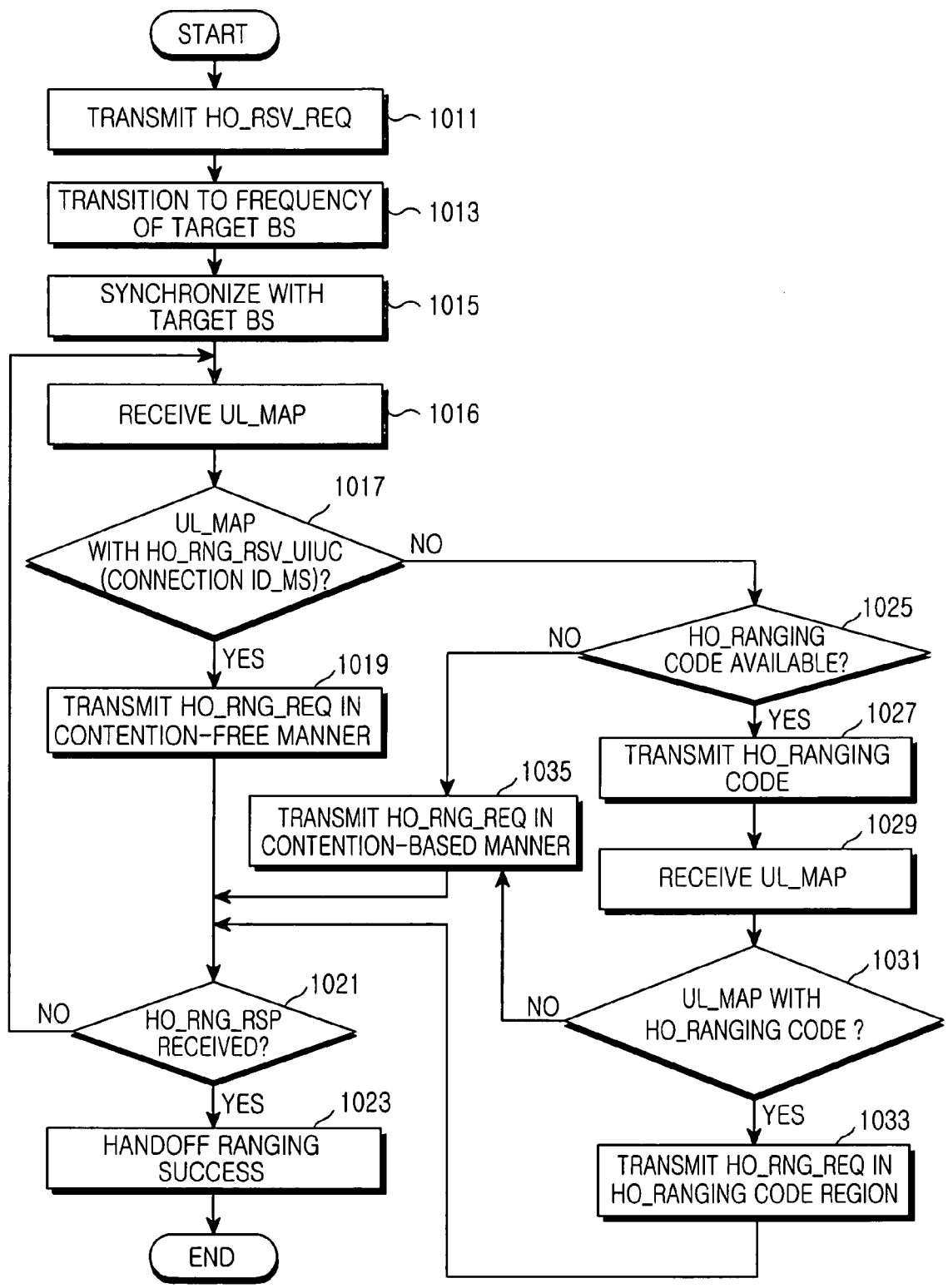
FIG. 10 is a flowchart illustrating a ranging operation in an SS in the OFDMA-based BWA communication system according to the second embodiment of the present invention.

FIG. 10 is a flowchart illustrating an SS based on OFDMA according to the second embodiment of the present invention. More specifically, in FIG. 10, a description is made of the SS 800 illustrated in FIG. 8.

Before describing FIG. 10, it is to be made sure that the SS can transmit HO_RNG_REQ or HO_Ranging Code to a target BS, that is, a second BS in the OFDMA scheme.

Referring to FIG. 10, during communication with the first BS 860, i.e., in a traffic state, the SS 800 detects information about neighbor BSs, uplink information, and system information by analyzing messages received on the uplink established for the SS 800, that is, a DL_MAP message, a UL_MAP message, and a UCD message, and correspondingly updates the related information.

The SS 800 monitors neighbor BSs set in the updated neighbor BS information, for example, six neighbor BSs, and determines whether there is a target BS for a handoff among the neighbor BSs. The target BS refers to a BS that transmits a stronger pilot channel signal that the first BS 860. The target BS is assumed to be the second BS 870 herein.

After detecting the target BS, the SS 800 transmits to the first BS 860 an HO_RSV_REQ message containing information about the second BS 870 in step 1011. In step 1013, irrespective of whether it receives a response for the HO_RSV_REQ message, the SS 800 transitions to the transmission frequency band of the second BS 870 in step 1013. The SS 800 synchronizes to the second BS 870 by a DL_MAP message received from the second BS 870 in step 1015. The DL_MAP message contains information about ranging codes.

Upon receipt of a UL_MAP message from the second BS 870 in step 1016, the SS 800 determines whether the UL_MAP message contains HO_RNG_RSV_UIUC with the connection ID of the SS 800 in step 1017. If the UL_MAP message contains HO RNG_RSV_UIUC, the SS 800 proceeds to step 1019. However, in the absence of the HO_RNG_RSV_UIUC, the SS 800 proceeds to step 1025.

In step 1019, the SS 800 transmits an HO_RNG_REQ message to the second BS 870 in a contention-free region assigned by the UL_MAP message. Upon receipt of an HO_RNG_RSP message in step 1021, the SS 800 determines that the handoff ranging is successful in step 1023. If the SS 800 fails to receive the HO_RNG_RSP message in step 1021, it returns to step 1016.

Even if the SS 800 fails to receive the UL_MAP message with HO_RNG_RSV_UIUC from the second BS 870 in step 1017, the SS 800 can use a handoff ranging code in the OFDMA-based system. Therefore, if the handoff ranging code is available in step 1025, the SS 800 transmits to the second BS 870 the handoff ranging code (HO_Ranging Code) set in a UL_MAP message as common information in step 1027 and receives a UL_MAP message from the second BS 870 in step 1029. Then, in step 1031, the SS 800 determines whether the UL_MAP message has a region assigned for transmission of an HO_RNG_REQ message, that is, a handoff ranging code region. If the UL_MAP message has a region assigned for transmission of an HO_RNG_REQ message, the SS 800 transmits the HO_RNG_REQ message to the second BS 870 in the handoff ranging code region in step 1033 and proceeds to step 1021. However, in the absence of the handoff ranging code region in the UL_MAP message, the SS 800 proceeds to step 1035.

If the handoff ranging code is not available to the SS 800 in step 1025, the SS 800 transmits the HO_RNG_REQ message to the second BS 870 in a contention-based manner in step 1035 and proceeds to step 1021.

It is possible that the second BS 870 cannot accept a handoff request from the SS 800. For example, if the available capacity of the second BS 870 being too small to service the SS 800, even if the CIN of a pilot signal from the second BS 870 is greater than a handoff threshold, the handoff is not available to the SS 800. In this case, the SS attempts the handoff through another neighbor BS or requests the handoff again to the second BS 870 a predetermined time later.

Figure 11:
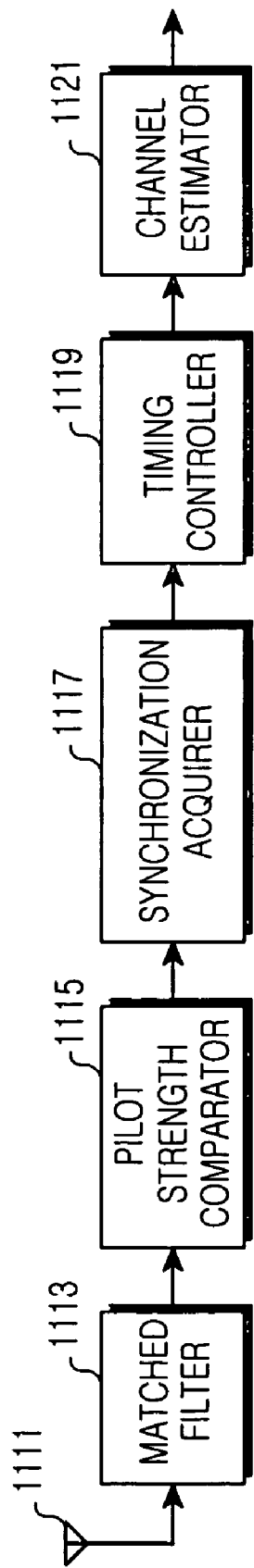
FIG. 11 is a block diagram of an SS according to the present invention.

FIG. 11 is a block diagram of an SS according to the present invention. Upon an initial power-on, the SS monitors all predetermined frequency bands and detects a pilot channel signal having a highest CINR. The SS selects a BS that transmits the pilot channel signal as a serving BS. After synchronizing with the BS, the SS receives a DL_MAP message from the BS and knowledge of neighbor BSs from the DL_MAP message. The operation of the SS after detecting information about the neighbor BSs will be described herein below.

Referring to FIG. 11, a pilot channel signal received from the air through antenna 1111 is provided to a matched filter 1113. The matched filter 1113 match-filters the pilot channel signal in correspondence to information about the serving BS and the neighbor BSs. The match filtering is carried out with respect to the center frequencies of the serving BS and the neighbor BSs (e.g., six neighbor BSs).

A pilot strength comparator 1115 compares the strengths of the match-filtered pilot channel signals for the serving BS and the neighbor BSs, received from the matched filter 1113 and outputs information about a center frequency corresponding to the strongest match-filtered pilot channel signal to a synchronization acquirer 1117. The synchronization acquirer 1117 acquires system synchronization in correspondence to the center frequency information received from the pilot strength comparator 1115. A timing controller 1119 controls an actual time offset based on information received from the synchronization acquirer 1117, and a channel estimator 1121 channel-estimates the time offset-controlled signal.

As described above, the present invention enables a handoff in a traffic state in an OFDM/OFDMA-based BWA communication system, that is, an IEEE 802.16e communication system. As a result, the mobility of an SS is supported and high data rate is ensured.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of implementing a handoff from a serving base station (BS) to one of a plurality of neighbor BSs by a subscriber station (SS) in a broadband wireless access (BWA) communication system including the serving BS for servicing the SS in at least one of a plurality of sub-carrier frequency bands, and the plurality of neighbor BSs adjacent to the serving BS, comprising the steps of:
   receiving information about the neighbor BSs from the serving BS;
   measuring CINRs (Carrier to Interference and Noise Ratios) of frequency band signals from the neighbor BSs;
   selecting a target BS from among the neighbor BSs having a highest of the measured CINRs;
   requesting a handoff to the target BS from the serving BS;
   transitioning to a frequency band of the target BS;
   synchronizing with the target BS;
   assigning the SS to a ranging information region for an initial connection from the target BS,
   transmitting ranging information for the initial connection to the target BS in the assigned ranging information region;
   receiving from the target BS connection identification (ID) information between the target BS and the SS;
   transmitting a handoff registration request message to the target BS according to the connection ID information; and
   receiving a response message for the handoff registration request message from the target BS.

2. The method of claim 1, wherein the neighbor BS information is included in downlink information received from the serving BS.

3. The method of claim 1, wherein the ranging information includes connection ID information between the SS and the serving BS.

4. The method of claim 1, wherein the ranging information region includes handoff ranging code information.

5. The method of claim 1, further comprising the step of transmitting the ranging information to the target BS in a contention-based manner, if the SS is not assigned to the ranging information region from the target BS.

6. The method of claim 1, wherein the neighbor BS information comprises at least one of a number of the neighbor BSs, IDs of the neighbor BSs, carrier frequencies of the neighbor BSs, frequency offsets of the neighbor BSs, and frame offsets of the neighbor BSs.

7. The method of claim 1, further comprising the step of receiving a message indicating whether the target BS acknowledges the handoff request, after transmitting the ranging information for the initial connection to the target BS.

8. A method of implementing a handoff from a serving base station (BS) to one of a plurality of neighbor BSs, upon a request from a subscriber station (SS), by the serving BS in a broadband wireless access (BWA) communication system including the serving BS for servicing the SS in at least one of a plurality of sub-carrier frequency bands, and the plurality of neighbor BSs adjacent to the serving BS, comprising the steps of:
   transmitting information about the neighbor BSs to the SS;
   receiving from the SS a handoff reserved request message including information about one of the neighbor BSs that the SS selects as a target BS for a handoff;
   transmitting to the target BS a handoff reserved indicator message indicating a handoff request from the SS;

receiving from the target BS a handoff information request message requesting information about the SS;

transmitting to the target BS a handoff information response message including the information about the SS;

receiving from the target BS a handoff indicator message indicating the handoff of the SS to the target BS; and transmitting to the target BS a handoff confirmation message confirming the handoff of the SS.

9. The method of claim 8, wherein the neighbor BS information comprises at least one of a number of the neighbor BSs, IDs of the neighbor BSs, carrier frequencies of the neighbor BSs, frequency offsets of the neighbor BSs, and frame offsets of the neighbor BSs.

10. The method of claim 8, wherein the handoff reserved indicator message includes the connection ID and MAC (Medium Access Control) ID of the SS.

11. The method of claim 8, wherein the handoff information response message includes information about a service provided to the SS by the serving BS.

12. The method of claim 8, wherein the handoff information response message includes information about an initial registration of the SS to the serving BS.

13. A method of implementing a handoff in a target base station (BS) upon receiving a handoff indication from a serving BS, the handoff indication being generated upon a handoff request from a subscriber station (SS), in a broadband wireless access (BWA) communication system including the serving base BS for servicing the SS in at least one of a plurality of sub-carrier frequency bands, and the target BS adjacent to the serving BS, comprising the steps of:

receiving from the serving BS a handoff reserved indicator message indicating the handoff request from the SS;

assigning a ranging information region for an initial connection to the SS;

receiving ranging information from the SS in the assigned ranging information region;

transmitting to the serving BS a handoff information request message requesting information about the SS;

receiving from the serving BS a handoff information response message including the information about the SS;

transmitting to the SS a ranging response message including new connection identification (ID) information;

receiving from the SS a handoff registration request message;

transmitting to the SS a handoff registration response message acknowledging the handoff registration of the SS; and transmitting to the serving BS a handoff indicator message indicating completion of the handoff of the SS to the target BS.

14. The method of claim 13, wherein the handoff reserved indicator message includes the connection ID and MAC ID of the SS.

15. The method of claim 13, wherein the ranging information region includes connection ID information between the SS and the serving BS.

16. The method of claim 13, wherein the handoff information response message includes information about a service provided to the SS by the serving BS.

17. The method of claim 13, wherein the handoff information response message includes information about an initial registration of the SS to the serving BS.

18. The method of claim 13, wherein the ranging response message includes information indicating an acknowledgement of the handoff.

19. The method of claim 13, wherein the ranging response message includes a MAC ID of the SS.

20. A system for implementing a handoff upon a request in a broadband wireless access (BWA) communication system, comprising:

a subscriber station (SS);

a serving base station (BS) for servicing the SS in at least one of a plurality of sub-carrier frequency bands; and at least one neighbor BS adjacent to the serving BS;

wherein the serving BS transmits information about the at least one neighbor BS to the SS, transmits to a target BS, selected from the at least one neighbor BS, a handoff reserved indicator message indicating a handoff request from the SS, upon receipt of a handoff reserved request message from the SS, the handoff reserved request message including information about the at least one neighbor BS that the SS selects as the target BS for a handoff, and transmits to the target BS information about the SS, upon receiving from the target BS a handoff information request message requesting the information about the SS;

wherein the SS selects the target BS by measuring CINRs (Carrier to Interference and Noise Ratios) of frequency band signals from the at least one neighbor BS detected from the received neighbor BS information, transmits to the serving BS the handoff reserved request message indicating the handoff of the SS to the target BS, transitions to the frequency band of the target BS and acquiring synchronization with the target BS, is assigned to a ranging information region for an initial connection from the target BS, transmits ranging information for the initial connection to the target BS in the assigned ranging information region, receives connection ID information between the target BS and the SS from the target BS, transmits a handoff registration request message to the target BS according to the connection ID information, and receives a response message for the handoff registration request message from the target BS; and wherein the target BS receives from the serving BS the handoff reserved indicator message indicating the handoff request from the SS, assigns the ranging information region for the initial connection to the SS, receives the ranging information from the SS in the assigned ranging information region, transmits to the serving BS the handoff information request message requesting the information about the SS, receives from the serving BS a handoff information response message including the information about the SS, transmits to the SS a ranging response message including new connection ID information, receives from the SS the handoff registration request message, transmits to the serving BS a handoff indicator message indicating completion of the handoff of the SS to the target BS, and receives from the serving BS a handoff confirmation message in response for the handoff indicator message.

21. The system of claim 20, wherein the neighbor BS information is included in downlink information transmitted from the serving BS to the SS.

22. The system of claim 20, wherein the ranging information includes handoff ranging code information.

23. The system of claim 20, wherein the ranging information includes connection ID information between the SS and the serving BS.

24. The system of claim 20, wherein the handoff information response message includes information about a service provided to the SS by the serving BS.

25. The system of claim 20, wherein the handoff information response message includes information about an initial registration of the SS to the serving BS.

26. The system of claim 20, wherein the neighbor BS information comprises at least one of a number of the at least one neighbor BS, IDs of the at least one neighbor BS, carrier frequencies of the at least one neighbor BS, frequency offsets of the at least one neighbor BS, and frame offsets of the at least one neighbor BS.

27. The system of claim 20, wherein the SS receives a message indicating whether the target BS has acknowledged the handoff request, after transmitting the ranging information to the target BS.

28. The system of claim 20, wherein the SS receives a message including a MAC ID of the SS from the target BS after transmitting the ranging information to the target BS.

* * * * *